US012761363B1

(12) United States Patent
Lasram et al.

(10) Patent No.: US 12,761,363 B1
(45) Date of Patent: Oct. 13, 2026

(54) SIMULATED DEPTH SENSOR SPREAD

(71) Applicant: Zoox, Inc., Foster City, CA (US)

(72) Inventors: Anas Lasram, South San Francisco, CA (US); Ximing Li, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 360 days.

(21) Appl. No.: 18/394,368

(22) Filed: Dec. 22, 2023

(51) Int. Cl.

| | |
|---|---|
| ***G01S 7/497*** | (2006.01) |
| ***G01S 7/48*** | (2006.01) |
| ***G01S 17/894*** | (2020.01) |
| ***G01S 17/931*** | (2020.01) |

(52) U.S. Cl.
CPC .......... *G01S 17/894* (2020.01); *G01S 7/4808* (2013.01); *G01S 17/931* (2020.01)

(58) Field of Classification Search
CPC ..... G01S 17/894; G01S 7/4808; G01S 17/931
See application file for complete search history.

(56) References Cited

U.S. PATENT DOCUMENTS

| | | | | |
|---|---|---|---|---|
| 12,162,515 | B1 * | 12/2024 | Srivastav | G01S 13/931 |
| 12,422,532 | B1 * | 9/2025 | Bhaskaran | G01S 7/497 |
| 2025/0076509 | A1 * | 3/2025 | Terefe | B60W 50/029 |

* cited by examiner

*Primary Examiner* — Isam A Alsomiri
(74) *Attorney, Agent, or Firm* — EIP US LLP

(57) ABSTRACT

A plurality of samples associated with a simulated environment in a vicinity of a depth sensor may be obtained. A first one of the plurality of samples may be within a bounded region associated with a projection from the depth sensor, and a second one of the plurality of samples may be within the bounded region associated with the projection from the depth sensor and is different from the first one of the plurality of samples. Based at least in part on the first one of the plurality of samples and the second one of the plurality of samples, a return of the depth sensor may be simulated.

4 Claims, 7 Drawing Sheets

SIMULATED DEPTH SENSOR SPREAD

BACKGROUND

Simulated data and simulations can be used to test and validate features and functionalities of real-world systems, including features and functionalities that may be otherwise prohibitive to test in the real world (e.g., due to safety concerns, limitations on time, repeatability, cost, etc.). For example, autonomous vehicles and other moving vehicles may use simulations to test and improve passenger safety, vehicle decision-making, sensor data analysis, and route optimization. However, simulations that accurately reflect real-world scenarios may be difficult to create. Additionally, simulations may involve multiple different systems and components interacting in a real-time simulated environment, which may be resource and computationally expensive.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
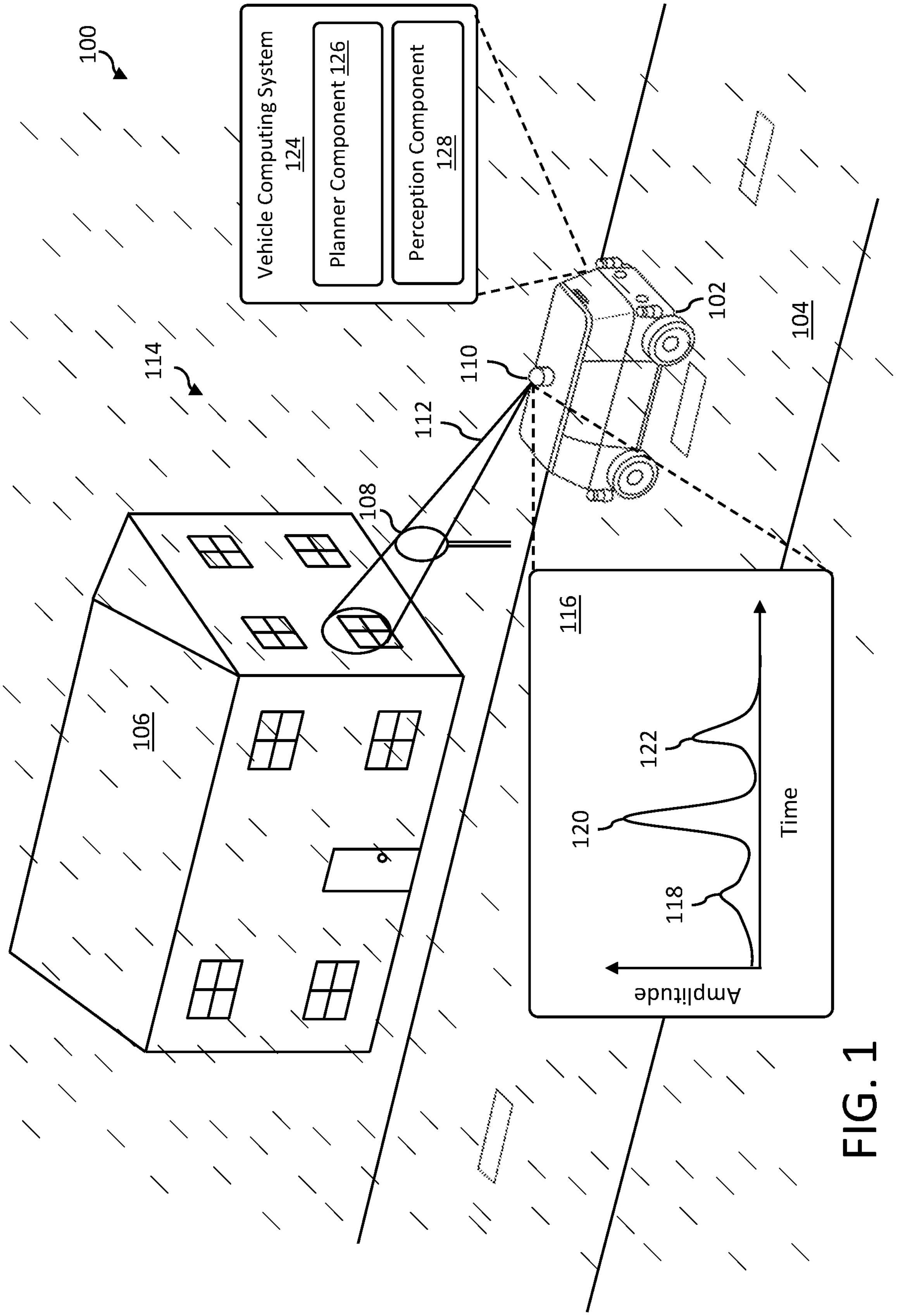
FIG. 1 is an illustration of a vehicle operating in an environment and implementing a vehicle control system, in accordance with examples of this disclosure.

This disclosure relates to techniques for simulating one or more depth sensor returns. A depth sensor is a device or system that captures information about distances of objects from the depth sensor as well as potentially identifying material properties of the objects. A depth sensor measures depth within a scene, providing data about the distances between the sensor and various points in the environment. Examples include time-of-flight (ToF) sensors that measure a time required for emitted energy to travel to an object and back to the sensor. By measuring the time of flight, the sensor can determine the distance to the object. Inspection of reflected amplitudes can also provide information on the reflectivity of objects, for example reflectivity may vary depending on the type of emitted energy and/or particular wavelength(s) used by the sensor. Other example depth sensors may use structured light technology which involves projecting a known pattern onto the scene and then analyzing how the pattern appears when reflected from a surface. The shape of the pattern, such as its deformation, provides information about the depth of the objects.

Examples described herein relate to the simulation of one or more returns of a depth sensor wherein a beam of a depth sensor may be approximated by a cone having a vertex at the simulated location of the depth sensor. The cone traces out a three-dimensional sub-region in an environment in a vicinity of the depth sensor so that a single simulated beam is capable of illuminating multiple objects within the (simulated) environment. This allows multiple portions of the beam that have reflected off respective objects in the environment, also referred to as echoes, to be received at the depth sensor allowing for the determination (e.g. simulation) of one or more depth sensor returns.

Approximating a beam of a depth sensor as a cone more accurately describes the phenomenon of beam divergence experienced in real-world depth sensors. Even diffraction-limited lasers experience beam spread. Depth sensors utilizing such lasers are capable of detecting multiple echoes of the laser corresponding to reflections off multiple objects in the environment of the sensor. The effect of beam spread becomes more appreciable as the quality of the beam decreases.

The disclosed techniques may be used to more accurately model or simulate the effects of this dispersion by modeling the contribution of multiple returns/echoes within a conical dispersion pattern and/or otherwise sampling within the conical dispersion pattern instead of at the center via a simple ray, for example. Multiple echoes may also be detected where part of the beam traverses through a transparent or translucent object, where some of the beam is reflected at a surface of the object and some of the beam is transmitted through the object and onto a more distant object in the environment.

Various examples described herein relate to performing simulations for autonomous vehicles, such as a driving simulation, in which a simulated autonomous vehicle includes at least one simulated depth sensor that is configured to detect distances between the depth sensor and objects in a vicinity of the depth sensor. In these examples, typical distances over which depth sensor data is obtained may be large enough that multiple returns may be detected for a single beam emission of the sensor, corresponding to reflections of multiple objects in an environment.

Depth sensors, through a combination of hardware and software, measure detected echoes of an emitted beam to generate data that can be provided to a computing system associated with the autonomous vehicle. The data can be at least partially utilised by the computing system in generating instructions to control the autonomous vehicle. Lidar sensors are one such example of depth sensors that may be present on autonomous vehicles, although others may also or alternatively, be present such as radar, sonar, and/or ToF sensors. Although the following discussion describes techniques in relation to lidar, it is understood that the techniques are equally applicable to other types of depth sensor.

Some example lidar sensors may be configured to provide a single return to the computing system based on sampling within a conical dispersion pattern. The single return may correspond to the strongest detected echo for a respective beam, corresponding to an echo having the highest amplitude when compared with any other detected echoes within a conical dispersion pattern. In other examples, the single return may correspond to an earliest detected echo, corresponding to a nearest object detected. In other examples, the single return may correspond to a latest detected echo, corresponding to a furthest object detected. Which single return to provide to the computing system may be predetermined.

Some example lidar sensors are configured to provide multiple returns from within a conical dispersion pattern to the computing system. The multiple returns may correspond to multiple echoes detected for a single beam, which, as described above, is possible due to the phenomenon of beam spreading and/or the reflection and transmission of the beam at a surface of a transparent or translucent object. Again, which of the multiple returns that are provided to the computing system may be predetermined and may include all or a subset of the strongest, earliest and latest (amongst other possible) returns. Real-world computing systems may determine which of the multiple returns are most relevant for generating instructions to control the autonomous vehicle. For example, machine learning algorithms may be trained to select one of multiple provided returns as the most relevant for controlling the autonomous vehicle.

In some examples, a heuristic or other rule-based model may be used to determine one or more returns that are to be used. It may be determined that some objects are associated with lidar returns that do not correspond to, for example, a strongest, earliest, latest return. A heuristic or other rule-based model may be used to select another of the returns than the strongest, earliest or latest return. Selection of which return(s) are to be used may be at least partially based on an object-type. Object classification may be performed by one or more image processing algorithms, such as a convolutional neural network, and may be used together with lidar sensor data to select a return to be used. In some examples, a database of rules may be used to determine which returns or combination of returns to use based on a classification algorithm and/or hard-coded classification from a time at which the simulation is generated.

Determining which of multiple returns to select may be at least partially based on an environmental condition in a vicinity of the autonomous vehicle. For example, rain that is present in the vicinity of the autonomous vehicle may appear as noise in a point cloud of lidar sensor data. This can affect the operation of the autonomous vehicle because at least some of the lidar returns corresponding to rain may be interpreted as an object within the planned path of the autonomous vehicle. Techniques for handling such real world scenarios are known.

Reproducing such real world phenomena in simulation has proved difficult. Generating and providing realistic, accurate, and/or high-resolution input data to sensors during simulations may be resource intensive and computationally expensive. This may limit the number of the simulation scenarios that can be executed, may limit the number of different sensors that can be realistically simulated, and/or may prevent certain simulations from being performed in real-time. For example, when simulating a driving environment, a simulation system may continuously generate and provide sensor data separately for each simulated sensor within the simulation. Each sensor data generation may require rendering a new view which can involve significant computational resources by the sensor engine and/or simulation system.

This may also place constraints on the allowed complexity of the simulation. One way to limit complexity is to approximate a single lidar beam as a one-dimensional ray. Such simulations may not accurately replicate real world results. For example, while this is computationally efficient, this type of simulation may only be capable of generating one return per lidar beam emission and so may not be able to simulate a multi return sensor. Furthermore, such simulations may struggle in certain environmental conditions. For example, some conditions may result in false positive returns that indicate the presence of an object that is not actually present. This may be referred to as distractors. Example distractors may include precipitation (rain, snow, hail, sleet, etc.), fog, smog, smoke, steam, and debris. Small particulates or similar matter may reflect the simulated lidar beam at random locations and times resulting in artefacts in the generated sensor data. A simulation using a one-dimensional beam is less able to distinguish between the environment and distractors.

Techniques described herein model a depth sensor beam as a cone. This may allow a categorization of multiple echoes from a single beam so that one or more returns can be determined, more closely approximating the real world. Example techniques will now be discussed in more detail with respect to FIG. 1 and FIG. 2. The scenario illustrated in FIG. 1 is an example real world scenario wherein multiple lidar echoes may be detected for a single lidar beam emission. A corresponding simulation to FIG. 1 then discussed with reference to FIG. 2.

FIG. 1 is a schematic diagram illustrating a vehicle 102 operating in an example environment 100. In the illustrated example, the vehicle 102 is traversing a road 104 in the environment 100, although in other examples the vehicle 102 may be stationary (e.g., stopped at a stop sign, red light, etc.) and/or parked in the environment 100. In some examples, such as the illustrative example of FIG. 1, one or more objects may be present in the environment 100. For instance, FIG. 1 illustrates a building 106 and a road sign 108 in the vicinity of the vehicle 102. Although not illustrated, any number and/or type of objects, including static objects, e.g., road signs, parked vehicles, fire hydrants, buildings, curbs, or the like, and/or dynamic objects, e.g., pedestrians, animals, cyclists, trucks, motorcycles, other vehicles, or the like, can additionally or alternatively be present in the environment 100.

In some examples, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 may be configured to control all functions from start to stop, including all parking functions, it can be unoccupied. In some examples, the vehicle 102 may include a semi-autonomous vehicle configured to perform at least a portion of the control functions associated with vehicular operation.

In various examples, a vehicle computing system 124 of the vehicle 102 may be configured to detect the building 106 and road sign 108 in the environment 100 based on sensor data received from a lidar sensor 110 associated with the vehicle 102. The lidar sensor 110 may be mounted on the vehicle 102 and/or may be remote from the vehicle 102, such as those mounted on other vehicles and/or mounted in the environment 100. In examples in which the depth sensor is a remote sensor (e.g., on another vehicle, mounted in the environment 100), the vehicle computing system 124 may be configured to receive the sensor data via one or more networks. In some examples, the vehicle computing system 124 may be configured to determine position, orientation, and/or location information associated with the vehicle 102 based on the sensor data.

Also present in the environment 100 in the example illustrated in FIG. 1 is precipitation in the form of rain 114. As described above, the presence of rain 114 can be detected by the lidar sensor 110 and may result in noise in sensor data and may make decisions about how to traverse the environment 100 more difficult or otherwise modify a return of the lidar sensor 110 when compared to a return not in the presence of rain 114. While the environment 100 includes rain 114 as an example distractor, the discussion herein is applicable to any scenario where distractors are present. Other example distractors include steam (e.g. emanating through steam grates), smoke (e.g. from vehicle exhausts), dust, other types of precipitation (e.g. hail, snow, sleet), smog and fog.

FIG. 1 illustrates a scenario in which the vehicle 102 is traveling through the environment 100 according to a planned path. The planned path may include a general planned route of travel for the vehicle 102 to travel from an initial location associated with a trip to a destination. In the illustrative example, the vehicle 102 is operating in a first lane of the road 104, the road 104 including the first lane associated with traffic traveling in a first direction and a second lane associated with traffic traveling in a second (opposite) direction. Though this is merely an illustrative example, and the vehicle may be configured to operate in intersections, in multi-lane roads, highways, and the like.

The vehicle 102 may include the vehicle computing system 124 configured to perform some or all of the functions described herein. In other examples, the vehicle computing system 124 may be remote from the vehicle 102 or a hybrid system including both local and remote portions. The vehicle computing system 124 may include a planner component 126 configured to determine the planned path and vehicle trajectories associated with the vehicle 102 operating according to the planned path.

The vehicle computing system may include a perception component 128 and/or a prediction component that implement techniques discussed in U.S. patent application Ser. No. 15/897,028 entitled "Detecting Blocking Objects" and filed Feb. 14, 2018, and U.S. patent application Ser. No. 15/947,486 entitled "Feature-Based Prediction" and filed Apr. 6, 2018, the entire contents of all of which are incorporated herein by reference and for all purposes. The perception component 128 may include functionality to perform object detection, segmentation, and/or classification. In some examples, the perception component 128 may provide processed sensor data that indicates a presence of an object that is proximate to the vehicle 102 and/or a classification of the object as an object type (e.g., car, pedestrian, cyclist, animal, building, tree, road surface, curb, sidewalk, unknown, etc.). In some examples, the perception component 128 may provide processed sensor data that indicates a presence of a stationary entity that is proximate to the vehicle and/or a classification of the stationary entity as a type (e.g., building, tree, road surface, curb, sidewalk, unknown, etc.). In additional or alternative examples, the perception component 128 may provide processed sensor data that indicates one or more characteristics associated with a detected object (e.g., a tracked object) and/or the environment 100 in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object (e.g., object speed), an acceleration of the object, an extent of the object (size), etc. Characteristics associated with the environment may include, but are not limited to, a presence of another object in the environment 100, a state of another object in the environment, a time of day, a day of a week, a season, a weather condition, an indication of darkness/light, etc.

The lidar sensor 110 may be configured to generate sensor data indicative of a distance between the lidar sensor 110 and one or more objects in the environment 100. The sensor data may be provided to the perception component 128 and processed to determine information about objects in the environment 100. The processed sensor data, or a derivative thereof, may then be provided to the planner component 126, which determines a planned path and vehicle trajectories associated with the vehicle 102 operating according to the planned path. In other words, the sensor data generated by the lidar sensor 110 may be at least partially utilized to generate instructions to operate the vehicle 102.

As described above, a beam 112 emitted by the lidar sensor 110 may undergo a level of beam spreading as it travels away from the lidar sensor 110. This spreading of the beam 112 may mean that multiple objects may be illuminated by the beam 112. In the example illustrated in FIG. 1, the beam 112 illuminates the building 106, the road sign 108, and a raindrop. An illustration of a lidar sensor measurement is shown in the box 116. The amplitude of the lidar sensor output is plotted as a function of time and shows three peaks 118, 120, 122 corresponding to respective reflections of the beam 112 detected by the lidar sensor 110 at respective times. A first peak 118 corresponds to a reflection of the lidar sensor beam 112 off the raindrop and shows a relatively low amplitude compared to the other peaks 120, 122 indicating that less of the beam 112 was reflected off the raindrop when compared with the amount of the beam 112 reflected off the road sign 108 and the building 106. A second peak 120 corresponds to a reflection of the lidar sensor beam 112 off the road sign 108. The amplitude of the second peak 120 is relatively high compared to the other peaks 118, 122 because the surface of the road sign 108, in this example, may be retroreflective. A third peak 122 corresponds to a reflection of the lidar sensor beam 112 off the building 106. The amplitude of the third peak 122 is between those of the first and second peaks 118, 122 indicating that more of the beam 112 was reflected off the building 106 when compared with the raindrop, but that less of the beam 112 was reflected off the building 106 when compared with the road sign 108.

The lidar sensor 110 may be configured to provide one or more returns, corresponding to one or more detected echoes 118, 120, 122, to the perception component 128 of the vehicle computing system 124. The lidar sensor 110 may be configured to provide selected returns corresponding to a subset of some or all of the strongest return (e.g. the reflection off the road sign 108), the earliest return (e.g. the reflection off the raindrop) and the latest return (e.g. the reflection off the building). The perception component 128 may then process, or filter, the returns provided by the lidar sensor 110 to determine which is most relevant to the vehicle 102 as it traverses the environment 100.

In an example, the lidar sensor 110 operates in a "dual return" mode, wherein two returns are determined and provided to the perception component 128. Again, which two returns from the full set of returns to provide may be based on respective characteristic associated with the returns. In an example, the strongest and latest return are provided, corresponding (in this example) to the reflections off the road sign 108 and the building 106 respectively. A strongest return may correspond to a closest non-distractor object and so may be selected as the most relevant return on which to base instructions to operate the vehicle 102. When distractors are present, a latest return may be selected as the most relevant return because it may correspond to an object behind a distractor (which may correspond to the strongest and/or earliest return). The decision of which return to select may be done automatically (e.g. based on the environmental conditions and/or a determination that distractors are present) or manually.

In some examples, returns provided to the perception component 128 may be any combination of the detected echoes 118, 120, 122. For example, a lidar system may carry out internal processing of the echoes as part of determining what to return. In a similar way, the simulated echoes may be processed as part of determining what to return.

Figure 2:
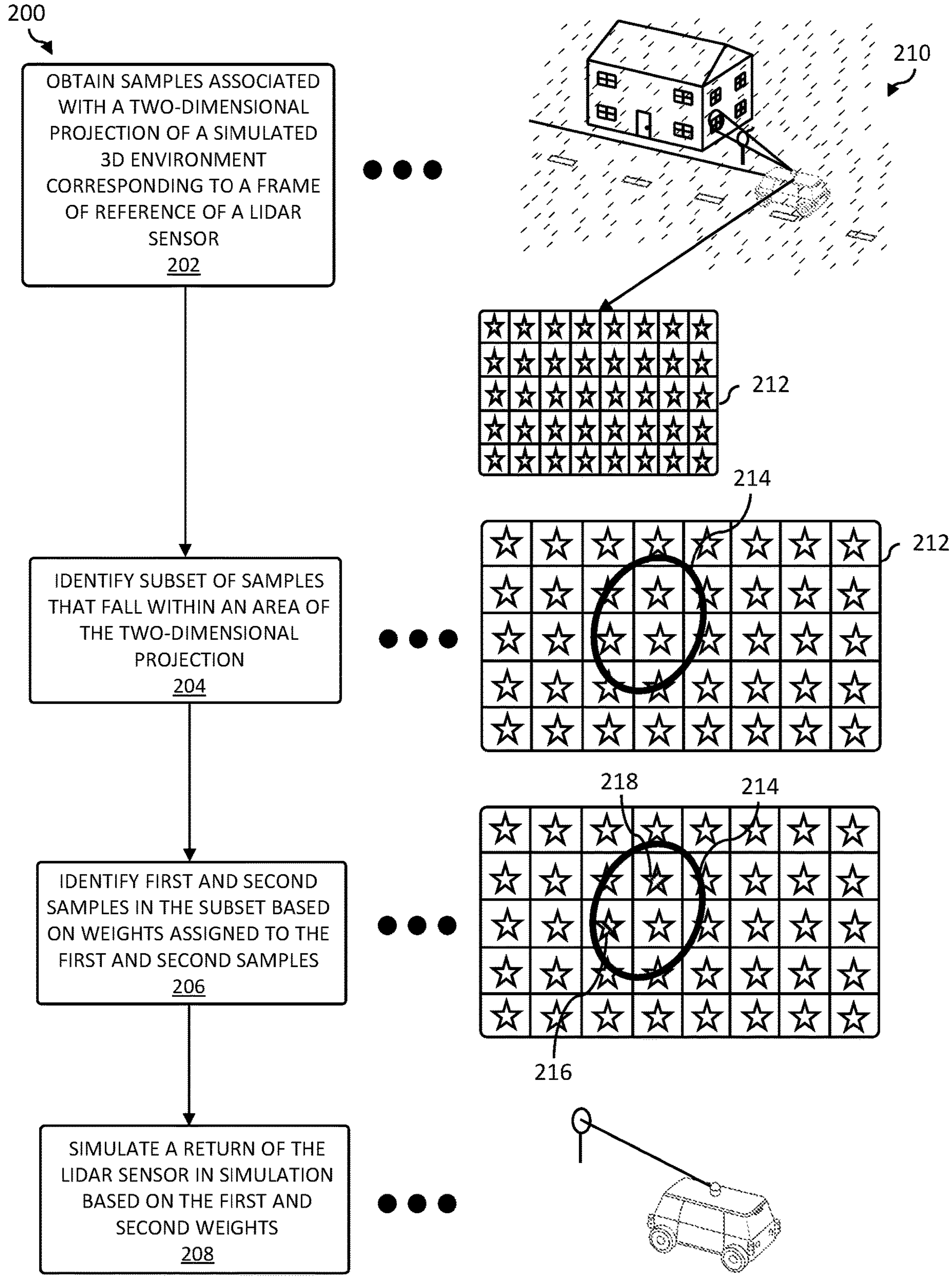
FIG. 2 illustrates a process for simulating a lidar return, in accordance with examples of this disclosure.

As described above, generating more than one return per lidar sensor emission in simulation is difficult. FIG. 2 illustrates a process 200 for simulating multiple lidar sensor returns for a simulated reproduction 210 of the scenario illustrated in FIG. 1. The simulations may test and/or validate the responses of a simulated vehicle to a variety of different simulated scenarios. For example, a simulation may model normal or abnormal driving conditions and/or vehicle conditions, using a variety of simulated environments and simulated objects or agents. Various different traffic conditions, environmental conditions, roadway obstructions, adverse safety conditions may be modelled to test and validate passenger safety, vehicle routing, decision-making, efficiency, etc. For instance, the simulation in which process 200 is performed may include a virtual environment that replicates the environment 100 illustrated in FIG. 1.

Certain simulations may test the responses of a simulated vehicle to defective and/or faulty sensors on the vehicle. Some simulations may be used to test individual components or systems of the simulated vehicle (e.g., a perception component, a decision-making or planning component, etc.). The same or different simulations may test the simulated vehicle as a whole, including interactions between the various components or systems of the vehicle. Simulations may include scenarios which rarely occur in the real world, such as collisions with other objects, violations of traffic rules, etc., yet still require testing to validate safe operation, and/or provide a mechanism to consistently test variations for control algorithms keeping other factors constant.

A simulated vehicle may interact with additional simulated agents and/or other objects in a simulated environment. In such simulations, the simulated agents and/or objects in the environment may include software-based objects controlled based on artificial intelligence(s) and/or other algorithms that can react to the actions of the simulated vehicle, while the simulated vehicle also reacts to the simulated agents/objects and to the conditions of the simulated environment. Simulations may provide highly realistic testing and validation for real world driving scenarios, by executing all of the simulated components (e.g., simulated vehicle(s), objects, and environment) concurrently within the simulated environment and supporting communications and interactions between the simulated components.

FIG. 2 illustrates a process 200 for simulating multiple echoes from a single beam, such as those corresponding to each of a raindrop of the rain 114, the road sign 108 and the building 106, and for selecting which one or more echoes to determine as lidar sensor returns. In this way, the process 200 more accurately replicates an operation of a real lidar sensor, such as the lidar 110. As will be discussed further, the process also allows the simulation of lidar returns when translucent and/or transparent objects are present in the simulated environment 210.

In various examples, some or all operations of the example process 200 may be performed by computing devices configured as simulation system(s) (e.g., virtual driving simulators), other types of simulated systems, and/or sensor engines configured to generate and provide sensor input data to simulation systems. Process 200, and various other examples herein, are described in reference to simulations during which a simulated vehicle with one or more depth sensors traverses through a simulated environment. During simulation, the vehicle depth sensors are provided with sensor input data representing the simulated environment 210 and the simulated agents/objects therein, and the simulated vehicle responds to the sensor input data by controlling the vehicle. However, it can be understood from the context of this disclosure that techniques described herein may be implemented in a similar or identical manner within other systems, including but not limited to video gaming systems, virtual reality systems, other simulation systems (e.g., flight simulators), and/or image/sensor data processing systems operating in physical (e.g., non-simulated) environments.

At block 202, the process 200 involves obtaining samples associated with a two-dimensional projection of the simulated 3D environment 210 corresponding to a frame of reference of a lidar sensor. The samples may be associated with respective objects that are in the simulated 3D environment 210 and may comprise one or more characteristics of the objects. The one or more characteristics may be material or physical properties associated with the objects and which may be detectable by the lidar sensor. For instance, each sample may comprise one or more of depth data, reflectivity/return strength data, material data, doppler data, surface orientation data, etc. Depth data may be indicative of a distance between an object in the simulated 3D environment 210 and a simulated location of the lidar sensor associated with the autonomous vehicle. Reflectivity data may be indicative of a reflectivity of the object at a wavelength of the laser utilized by the lidar sensor. In other words, a strength of a returned beam vs the corresponding emitted beam.

The samples may be obtained by a sensor engine associated with the simulation. The sensor engine may determine one or more two-dimensional projections, or views, of the 3D simulated environment 210 to be rendered at a particular time during the simulation from the point of view of the simulated lidar sensor. In other words, the two-dimensional projection may correspond to a 2D view of the environment 210 as seen from a perspective of the lidar sensor at the particular time.

The sensor engine, described below in more detail, may include one or more computing devices associated with a driving simulation system. The sensor engine may retrieve a set of sensor configuration data identifying the input data that is to be provided to the lidar sensor, relative to the simulated environment. For example, sensor configuration data may include the position, orientation angle, and/or field of view of the lidar sensor within the simulated environment. These factors may determine which 2D view(s) can and cannot be used to generate sensor data to provide as input to the lidar sensor. Additionally, sensor configuration data may include the type of data that the lidar sensor is configured to detect, and may include any combination of physical properties of the objects within the simulated environment. For instance, the lidar sensor may be configured to detect data, material properties (e.g., material type/composition, reflectance, roughness, etc.), and so on.

Along with the sensor configuration data, the sensor engine may retrieve data relating to the 2D views currently or previously rendered within the simulation. The data relating to the 2D views may include the "position" of the 2D view within the 3D simulated environment 210, such as the focal point and/or angle or orientation of the 2D view, as well as the type(s) of data stored in the 2D view (e.g., types of sensor data such as light, color, depth, object ID, velocity, material data, etc.).

The sensor engine may retrieve and analyze various timing data and/or movements of the simulated objects within the context of the current simulation. For example, relevant timing data may include the sensor execution rates (which also may be referred to as sampling rates or firing rates) of each sensor operating in the simulation, and the rendering times/rates associated with the different 2D views generated for the simulation. The sensor engine also may determine the capacities of the available GPU(s) or other processors for rendering 2D views (e.g., cores, GPU speed, storage, current rendering backlog, latency, network speed) and/or the capacities of the available CPU(s) or other processors to perform pre-processing and post-processing operations in connection with rendering views and generating sensor data by the GPU. Additionally, the sensor engine may receive object movement data, including the velocity and direction of travel of the simulated vehicle, and the velocity and direction of other simulated agents/objects in the simulation.

Based on the sensor configuration data and/or other simulation data, the sensor engine may apply one or more heuristics-based algorithms and/or machine-learning models to determine which view(s) will be rendered at various different times during the simulation. In some examples, the sensor engine may determine a single view to render, or may determine a priority listing of the existing views and/or new views to be created, based on the sensor configurations, view data, mapping data, etc. The view(s) selected by the sensor engine may be provided to GPU for rendering, after which the updated rendered views may be incorporated into the simulation system and used as input data by the lidar sensor.

The sensor engine may generate a 2D view of the simulated 3D environment 210 from the frame of reference of the lidar sensor. In some examples, the 2D view generated may correspond to a view selected by the sensor engine in operation 102. The sensor engine may initiate rasterization processes on a GPU to generate the depth data, and may access and analyze simulated object data within the simulated environment to determine object identifiers, velocities, material data, reflectance, roughness, etc. Various example techniques for generating the two-dimensional projection of the simulated 3D environment 210 are discussed in U.S. patent application Ser. No. 17/321,205 entitled "Sensor Simulation with Unified Multi-Sensor Views" and filed May 14, 2021, the entire contents of which is incorporated herein by reference for all purposes.

In some examples, the sensor engine may generate a 2D view of the simulated 3D environment 210 from the frame of reference of the lidar sensor using a ray tracing algorithm. Ray tracing simulates the way light interacts with objects in the simulated environment and involves tracing paths of rays of light as they travel through the 3D environment 210. Simulating depth sensor emissions using ray tracing can therefore simulate the effects of reflections, refractions, and shadows. For these reasons, ray tracing may provide a higher quality two-dimensional representation of the simulated 3D environment 210 compared to rasterization, but may be computationally more demanding.

In an example, a plurality of rays cast radially from a point, or surface, corresponding to a location of the lidar sensor may sample the simulated 3D environment 210 at a corresponding plurality of points. Rays may be cast over some or all of the 3D simulated environment 210 at a given point in time. In some examples, a first subregion of the simulated 3D environment 210 is sampled at a first time. The first subregion that is sampled may correspond to the subregion that would be illuminated by a single beam emission of a real-world lidar sensor. The rays may be cast with a regular distribution in spherical polar coordinates with the location of the lidar sensor at the origin, although in other examples the rays may be cast according to some other distribution, such as a regular distribution in another coordinate system, or an irregular or random distribution.

In some examples, at a second time, a second sub-region of the simulated 3D environment 210 may be sampled, with the rays originating from a location of the lidar sensor at the second time (e.g. after the vehicle has moved from a first position to a second position between the first and second times). The sampled subregions may be amalgamated together using reprojection to form the 2D view of the simulated 3D environment 210 from the frame of reference of the lidar sensor.

The intersection points of each ray in the simulated 3D environment 210 may be inspected and may be at least partially used to determine the plurality of samples. Data associated with the intersection points may be obtained, such as a distance between the lidar sensor and the intersection point, and/or a reflectivity of the simulated 3D environment 210 at the intersection point.

As described above, the samples may be associated with respective objects that are present in the simulated 3D environment 210. The samples may correspond to the relative positions of the objects as viewed from the frame of reference of the lidar sensor, such as the frame of reference identified in the 2D projection of the simulated 3D environment 210. The number of samples obtained may constitute an oversampling of the simulated 3D environment 210 compared to an actual rate at which lidar sensor data is generated by a lidar sensor. For instance, if a lidar sensor, real or simulated, is configured to emit 100 beams per second, then the samples in the simulation may be obtained at a rate corresponding to 1000 beams per second. The reason for this oversampling will become more apparent with regards to the discussion of block 204 below, but in short, it relates to the process 200 simulating a lidar beam as a cone by sampling a plurality of the "simulated" beams for each lidar emission.

In some examples, obtaining the samples may comprise selecting candidate samples based on a transparency of a respective object. Where ray tracing is used to generate the 2D representation and obtain samples, object transparency may be taken into account by the ray tracing procedure. For example, a sample may be selected based on the final intersection of a ray with an opaque object (after having possibly refracted through a transparent object previously, for example), and so further techniques may not be needed to accommodate a consideration of such objects.

However, further techniques may be used to simulate an effect of translucent and/or transparent objects in the 3D environment 210, that may be applicable where a rasterization process is performed. For example, population of a depth buffer during a rasterization procedure may involve performing a selection of objects in the environment based on a transparency associated with the objects in a process that may be referred to as transparency dithering, or just dithering. That is, objects in the simulated 3D environment 210 may be assigned an indication of an amount of transparency, and then selected as samples based on the assigned indication.

In an example, the indication may be a probability, where a probability value of 1 may indicate a completely opaque object, a probability value of 0 may indicate a completely transparent object, and probabilities between 0 and 1 may be assigned to objects based on a level of translucency between transparent and opaque. When populating the depth buffer, a foreground object may be selected, or not selected, based on the assigned indication (e.g. probability). In an example, an object assigned a probability of 0.5 may be selected as a sample half the time. The resulting selection of samples may then replicate the appearance of translucent and/or transparent objects in the real world. Probabilities and/or the method used to select samples based on the probabilities can be adjusted according to ground truth data, for example, by comparing the plurality of samples obtained across the full 2D representation of the simulated 3D environment 210 with a generated point cloud corresponding to lidar sensor data obtained for a similar real-world environment.

It is understood that this type of probabilistic procedure is not restricted to where rasterization is performed. For instance, it could also be applied where ray tracing is used. For example, an assigned probability may be used to determine whether to select an object as a sample where a ray intersects with the object. If the object is not selected, the trajectory of the ray can be continued through the object until it intersects a further object, at which point an assigned probability may be used to determine whether to select the further object as a sample, and so on.

The obtained samples may be stored in a grid 212, illustrated as stars in the grid 212. The grid 212 may correspond to a discretization of the 2D representation of the simulated 3D environment 210, and one sample may be associated with each square of the grid (in this case positioned in the centers of each square of the grid). The properties of the grid 212 may be determined based on properties of the real-world lidar sensor being simulated, such as a sensor resolution. The samples may be distributed based on the spatial positions of the objects associated with the samples from the frame of reference of the lidar sensor. Any 2D projection of the simulated 3D environment 210 may be used such as an environment map, cube map, and sphere map. The grid 212 is illustrated as cartesian, but this is for illustration purposes only, and it is apparent that the properties of an actual grid used may be dependent on the 2D projection used. In some other examples, the grid 212 may be rectilinear or curvilinear, for example.

At block 204, the process 200 involves identifying a subset of samples that fall within an area of the two-dimensional projection. The area of the two-dimensional projection may correspond to the three-dimensional subregion occupied by a simulated lidar beam as it travels away from the lidar sensor.

With the obtained samples distributed in the grid 212 as discussed above with regards to block 202, identifying a subset of samples that fall within an area of the two-dimensional projection may comprise sampling a subregion of the grid that corresponds to the three-dimensional region swept out by a lidar beam. In practice, this corresponds to selecting all samples that fall within a region 214 of the grid 212, with the width of the region 214 corresponding to the maximum expected spread experienced by the lidar beam in operating conditions. The region 214 illustrated in FIG. 2 is not to scale, as the beam spread experienced by a laser is typically very low. This process of identifying a subset of samples that fall within an area of the two-dimensional projection is described in more detail below with regards to FIG. 7.

Where the plurality of samples have been obtained by casting a plurality of rays into the simulated 3D environment 210, identifying a subset of samples that fall within an area of the two-dimensional projection may involve identifying samples that were obtained from rays within a conical envelope having a vertex at the location of the lidar sensor. This may be equivalent to identifying samples obtained from rays that intersect a 2D subregion corresponding to a cross section or projection of such a conical envelope.

The subset of samples that fall within the region 214 may be identified as corresponding to objects whose echoes would be expected to be received when a real lidar sensor emits a single beam. It can therefore be seen that the process 200 more accurately replicates the physics of a real world lidar sensor by simulating multiple echoes per lidar beam emission.

At block 206, the process 200 involves identifying first and second samples 216, 218 in the subset based on weights assigned to the first and second samples. Weights may be assigned to the samples based on one or more physical properties associated with the samples. In some examples, the weights may be applied based on at least one of a depth (e.g. distance from the lidar sensor to an object associated with the sample) and a reflectivity of a surface of the object at the position in which the sample was obtained. For instance, a higher (or lower) weight may be assigned to a sample being closer to the lidar sensor and having a higher (or lower) reflectivity than a sample being further from the lidar sensor and having a lower reflectivity.

In some examples, a weight, W, may be determined using a function, F, of depth data, D, and reflectivity data, R, such as is illustrated in Equation 1 below.

$$W=F(D,R) \qquad \text{Equation 1}$$

The function, F, may be determined, or trained, such that the calculated weight, W, is higher for larger values of D and R. In some examples, the function, F, may be separable such that F(D,R)=f(D)*g(R), where * is some operator. Parameters associated with the function, F, can be trained using a machine learned model and/or by comparison with ground truth data. For instance, the function, F, may be determined, or trained, to emulate an effect that respective samples would have on a real depth sensor detection.

The identification of the first and second samples 216, 218 in the subset may emulate how first and second echoes are identified in a real-world lidar sensor. With regards to the scenario illustrated in FIG. 1, the lidar sensor 110 detects three echoes corresponding to the three peaks 118, 120, 122, and may operate to identify one, two or all three echoes that may be provided as simulated output lidar returns from a single corresponding lidar emission. By assigning weights to the samples in the subset, the process 200 can categorize and rank samples based on expected echoes from each sample in the real world.

In an example, the samples can be ranked in order of magnitude of assigned weights. A sample in the subset being assigned the highest weight may be identified as a sample that would be expected to show as an echo having the highest amplitude when compared with other samples in the subset. A sample in the subset assigned the lowest weight may be identified as a sample that would be expected to show as the latest received echo when compared with other samples in the subset. Other identifications can be made, or learned (for example, by one or more machine learning algorithms) based on the assigned weights.

Referring to the simulated scenario illustrated in 210, a sample corresponding to the road sign may be assigned a highest weight when compared with other samples in the subset because the road sign is relatively close to the lidar sensor and has a high reflectivity (e.g. retroreflectivity). The building, being the most distant object within the region swept out by the lidar beam, may be assigned the lowest weight. A sample corresponding to a raindrop, located between the road sign and the lidar sensor, may be in the subset. The sample corresponding to the raindrop may be assigned an intermediate weight because, while the raindrop may be the closest object to the lidar sensor, it may have a low reflectivity with compared with the road sign and building. Samples may be identified based on their assigned weights. When samples having highest and lowest assigned weights are identified, the samples corresponding to the road sign and the building may be identified.

It is understood that more than the first and second samples 216, 218 may be identified in the subset at block 206. For instance, a number of samples that are identified in the subset may be based on an actual number of echoes that a corresponding real-world lidar sensor is configured to identify from a detector output (e.g. output 116). In some examples, a number of samples that are identified may be based on a number of returns that a corresponding real-world lidar sensor is expected to provide (e.g. whether the lidar sensor is operating in a "dual mode", "triple mode" or higher return mode).

At block 208, the process 200 involves simulating a return of the lidar sensor in simulation based at least in part on the first and second weights. The simulation of the return may depend on the properties of the lidar sensor being simulated. For instance, and as discussed above, some lidar sensors operate in a "single return" mode, where only a single lidar return is output per beam emission. In this case, simulating a return of the lidar sensor in simulation based on the first and second weights involves selecting one of the first and second samples 216, 218 to output as the lidar sensor. As discussed above, a sample corresponding to an echo from the road signal may have been assigned the highest weight based on the relative proximity to the lidar sensor as well as the relatively high reflectivity. The sample having the highest weight may be associated with a strongest return, and this may be selected in block 208.

In some examples, the return of the lidar sensor may be at least partially based on contributions from both the first and second samples (and possibly further samples). For instance, a plurality of samples in the identified subset may correspond to reflections off the same object. In such examples, the lidar return simulated at block 208 may be based on at least two of these plurality of samples. This may be the case where several of the samples in the subset are associated with similarly assigned weights, indicating that the samples may correspond to the same object.

It has also been described above that a lidar sensor may provide the capability to select what type of echo is output as the single return. Such a selection may be predetermined, perhaps by the manufacturer of the lidar sensor, or a user of the lidar sensor. For instance, the lidar sensor may be configured to return the echo having the highest amplitude compared to any other detected echoes. The process 200 allows an emulation of this selection by providing one of the first or second samples 216, 218 as a single return.

It can be seen that process 200 allows for lidar sensor behaviour to be more accurately simulated when compared with conventional simulations. For example, where a lidar beam is conventionally simulated as a one-dimensional ray, the return for a single lidar beam emission may correspond to a first object that the ray intersects. Instead, process 200 comprises inspecting a plurality of samples that would be illuminated by a single beam of a lidar sensor, and allows the plurality of samples to be categorized and a selection of the most likely return for that beam emission to be made. In this way, not only are the resulting returns likely to differ from a 1D ray simulation in certain circumstances, but the simulated returns are more likely to accurate replicate the returns that would be expected in the real world.

The process 200 also allows for the determination of more than one return. As described above, some lidar sensors may be configured in a "dual return" mode, whereby returns corresponding to two echoes are output. At block 208, the return of the lidar sensor described above may be a first simulated return. In some examples, block 208 may further comprise simulating a second return of the lidar sensor in simulation based on the first and second weights. As discussed above, a determination of which sample to identify within the area 214 as the second return may be based on a second type of return determined by a real-world lidar sensor. For example, if the first sample is determined as the first return because it has the highest assigned weight (perhaps corresponding to the strongest return that would be expected in the real world), then a second sample may be determined as the second return based on it being assigned the lowest weight, when compared to other samples in the subset. A sample having the lowest assigned weight might correspond to the latest return.

In this way, the process 200 can be used to simulate a lidar sensor operating in a "dual return" mode. In a similar way to what has been described above with regards to FIG. 1, by providing two returns allows the simulation engine to apply similar techniques to distinguish between non-distractor and distractor objects in the 3D simulated environment 210. For instance, when distractors are determined to be present, instructions to control a vehicle may be based on the return corresponding to the latest echo (e.g. a sample assigned the lowest weight in the subset). When distractors are not present, instructions to control a vehicle may be based on the return corresponding to the strongest echo (e.g. a sample assigned the highest weight).

It can be seen that the process 200 also allows for the simulation of three or more returns, for example, by identifying three or more samples within the area 214 on the grid 212 based on assigned weights at block 206 and then simulating the three of more returns based on the three or more samples.

While the process 200 has been described as obtaining and categorizing samples associated with a two-dimensional projection of the simulated 3D environment 210 corresponding to a frame of reference of a lidar sensor, it is understood that such samples may alternatively be obtained and categorized using a full three-dimensional simulation. This will be discussed further with reference to FIG. 4.

Figure 3:
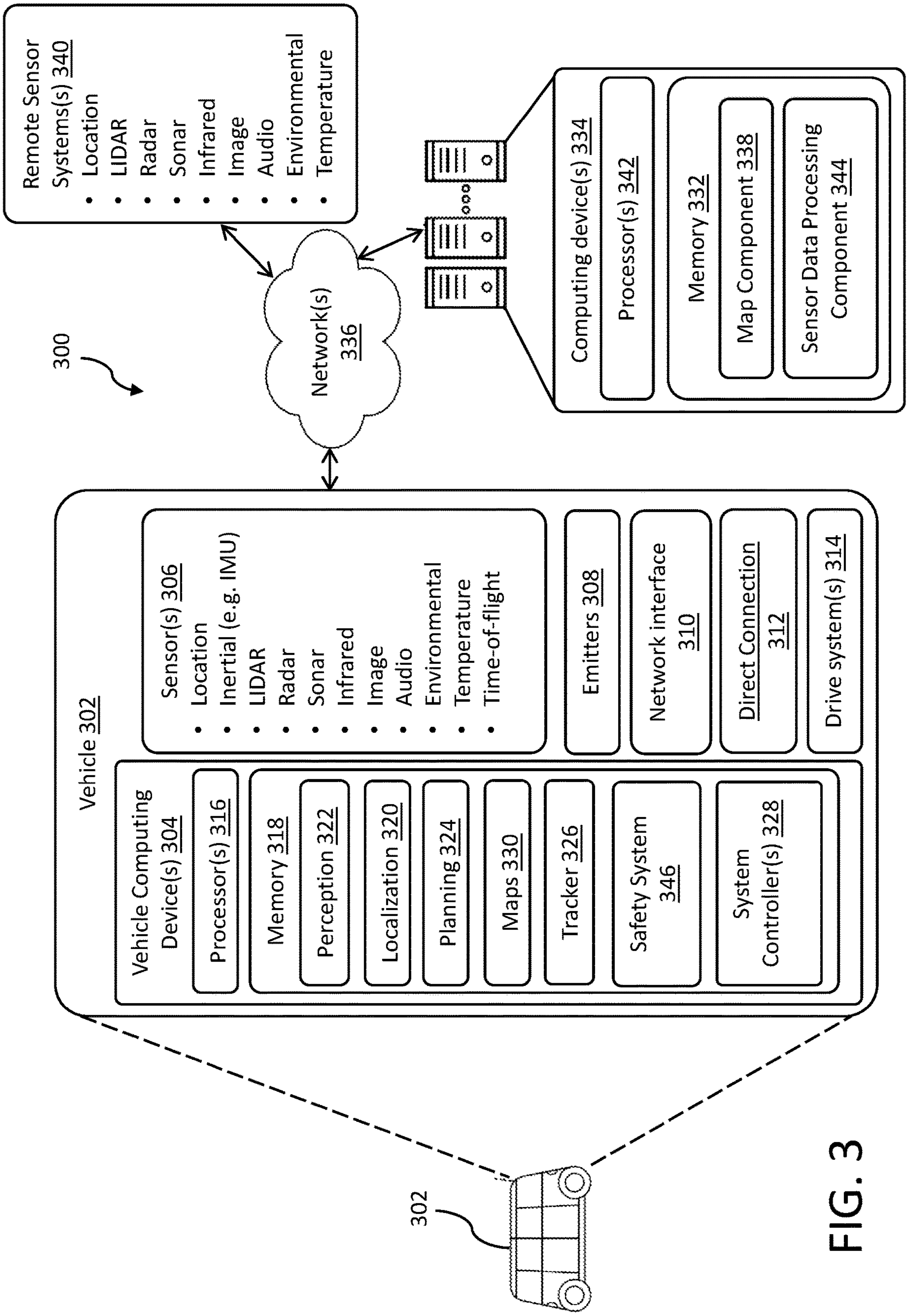
FIG. 3 is a block diagram of an example system for implementing the techniques described herein.

FIG. 3 illustrates a block diagram of an example system 300 that implements the techniques discussed herein. FIG. 3 may represent vehicle 102 and the described computing device(s) 124 of FIG. 1. In some instances, the example system 300 may include a vehicle 302. In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 302 may be a fully or partially autonomous vehicle having any other level or classification. Moreover, in some instances, the techniques described herein may be usable by non-autonomous vehicles as well.

The vehicle 302 may include a vehicle computing device(s) 304, sensor(s) 306, emitter(s) 308, network interface(s) 310, and/or drive system(s) 312. Sensor(s) 306 may represent lidar sensor 110. The system 300 may additionally or alternatively comprise computing device(s) 332.

In some instances, the sensor(s) 306 may include further lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 306 may include multiple instances of each of these or other types of sensors. For instance, the radar sensors may include individual radar sensors located at the corners, front, back, sides, and/or top of the vehicle 302. As another example, the cameras may include multiple cameras disposed at various locations about the exterior and/or interior of the vehicle 302. The sensor(s) 306 may provide input to the vehicle computing device(s) 304 and/or to computing device(s) 332.

The vehicle 302 may also include emitter(s) 308 for emitting light and/or sound, as described above. The emitter(s) 308 may include interior audio and visual emitter(s) to communicate with passengers of the vehicle 302. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 308 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 302 may also include network interface(s) 310 that enable communication between the vehicle 302 and one or more other local or remote computing device(s). The network interface(s) 310 may facilitate communication with other local computing device(s) on the vehicle 302 and/or the drive component(s) 312. The network interface(s) 310 may additionally or alternatively allow the vehicle to communicate with other nearby computing device(s) (e.g., other nearby vehicles, road signals, etc.). The network interface(s) 310 may additionally or alternatively enable the vehicle 302 to communicate with computing device(s) 332 over a network 338. In some examples, computing device(s) 332 may comprise one or more nodes of a distributed computing system (e.g., a cloud computing architecture).

The vehicle 302 may include one or more drive components 312. In some instances, the vehicle 302 may have a single drive component 312. In some instances, the drive component(s) 312 may include one or more sensors to detect conditions of the drive component(s) 312 and/or the surroundings of the vehicle 302. By way of example and not limitation, the sensor(s) of the drive component(s) 312 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 312. In some cases, the sensor(s) on the drive component(s) 312 may overlap or supplement corresponding systems of the vehicle 302 (e.g., sensor(s) 306).

The drive component(s) 312 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 312 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 312. Furthermore, the drive component(s) 312 may also include one or more communication connection(s) that enable communication by the respective drive component with one or more other local or remote computing device(s).

The vehicle computing device(s) 304 may include processor(s) 314 and memory 316 communicatively coupled with the one or more processors 914. Computing device(s) 332 may also include processor(s) 334, and/or memory 336. The processor(s) 314 and/or 334 may be any suitable processor capable of executing instructions to process data and perform operations as described herein. By way of example and not limitation, the processor(s) 314 and/or 334 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 316 and/or 336 may be examples of non-transitory computer-readable media. The memory 316 and/or 336 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 316 and/or memory 336 may store a perception component 318, localization component 320, planning component 322, map(s) 324, driving log data 326, prediction component 328, and/or system controller(s) 330—zero or more portions of any of which may be hardware, such as GPU(s), CPU(s), and/or other processing units.

The perception component 318 may detect object(s) in in an environment surrounding the vehicle 302 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 318 is referred to as perception data. The perception component 318 may be configured to associate a bounding region (or other indication) with an identified object. The perception component 318 may be configured to associate a confidence score associated with a classification of the identified object with an identified object. In some examples, objects, when rendered via a display, can be colored based on their perceived class. The object classifications determined by the perception component 318 may distinguish between different object types such as, for example, a passenger vehicle, a pedestrian, a bicyclist, motorist, a delivery truck, a semi-truck, road signage, and/or the like.

In at least one example, the localization component 320 may include hardware and/or software to receive data from the sensor(s) 306 to determine a position, velocity, and/or orientation of the vehicle 302 (e.g., one or more of an x-, y-, z-position, roll, pitch, or yaw). For example, the localization component 320 may include and/or request/receive map(s) 324 of an environment and can continuously determine a location, velocity, and/or orientation of the autonomous vehicle 302 within the map(s) 324. In some instances, the localization component 320 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 320 may provide data to various components of the vehicle 302 to determine an initial position of an autonomous vehicle for generating a trajectory and/or for generating map data, as discussed herein. In some examples, localization component 320 may provide, to the perception component 318, a location and/or orientation of the vehicle 302 relative to the environment and/or sensor data associated therewith.

The planning component 322 may receive a location and/or orientation of the vehicle 302 from the localization component 320 and/or perception data from the perception component 318 and may determine instructions for controlling operation of the vehicle 302 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 330 and/or drive component(s) 312 may parse/cause to be carried out, second instructions for the emitter(s) 308 may be formatted according to a second format associated therewith).

The driving log data 326 may comprise sensor data, perception data, and/or scenario labels collected/determined by the vehicle 302 (e.g., by the perception component 318), as well as any other message generated and or sent by the vehicle 302 during operation including, but not limited to, control messages, error messages, etc. In some examples, the vehicle 302 may transmit the driving log data 326 to the computing device(s) 332.

The prediction component 328 may generate one or more probability maps representing prediction probabilities of possible locations of one or more objects in an environment. For example, the prediction component 328 may generate one or more probability maps for vehicles, pedestrians, animals, and the like within a threshold distance from the vehicle 302. In some examples, the prediction component 328 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 322 may be communicatively coupled to the prediction component 328 to generate predicted trajectories of objects in an environment. For example, the prediction component 328 may generate one or more predicted trajectories for objects within a threshold distance from the vehicle 302. In some examples, the prediction component 328 may measure a trace of an object and generate a trajectory for the object based on observed and predicted behavior. Although prediction component 328 is shown on a vehicle 302 in this example, the prediction component 328 may also be provided elsewhere, such as in a remote computing device. In some examples, a prediction component may be provided at both a vehicle and a remote computing device. These components may be configured to operate according to the same or a similar algorithm.

The memory 316 and/or 336 may additionally or alternatively store a mapping system, a planning system, a ride management system, etc. Although perception component 318 and/or planning component 322 are illustrated as being stored in memory 316, perception component 318 and/or planning component 322 may include processor-executable instructions, machine-learned model(s) (e.g., a neural network), and/or hardware.

As described herein, the localization component 320, the perception component 318, the planning component 322, and/or other components of the system 300 may comprise one or more ML models. For example, the localization component 320, the perception component 318, and/or the planning component 322 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 320 may additionally or alternatively store one or more system controller(s) 330, which may be configured to control steering, propulsion, braking, safety, emitters, communication, and other systems of the vehicle 302. These system controller(s) 330 may communicate with and/or control corresponding systems of the drive component(s) 312 and/or other components of the vehicle 302.

It should be noted that while FIG. 3 is illustrated as a distributed system, in alternative examples, components of the vehicle 302 may be associated with the computing device(s) 332 and/or components of the computing device(s) 332 may be associated with the vehicle 302. That is, the vehicle 302 may perform one or more of the functions associated with the computing device(s) 332, and vice versa.

Figure 4:
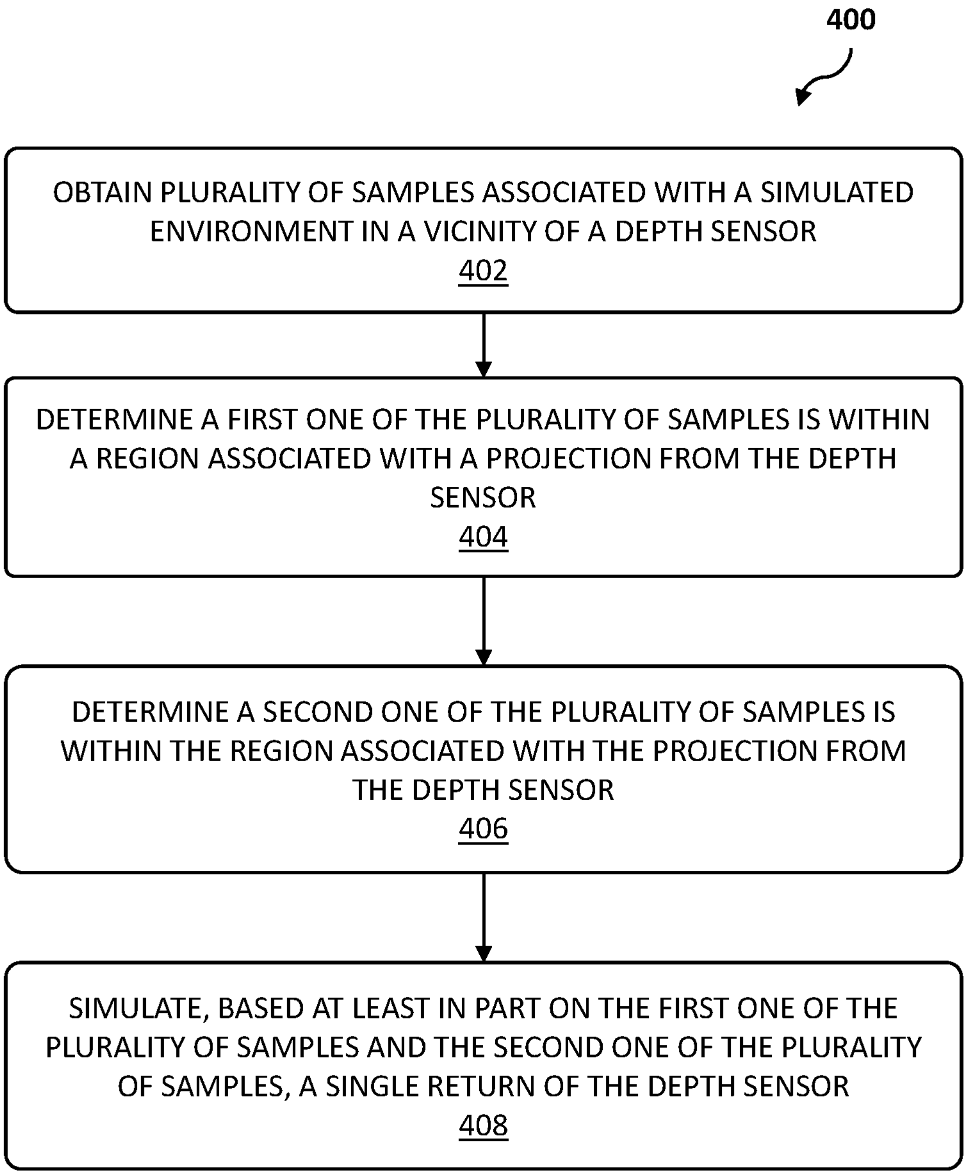
FIG. 4 depicts an example process for simulating one or more depth sensor returns, in accordance with examples of this disclosure.

FIGS. 1 and 2 illustrate example scenarios that relate to determining and simulating lidar sensor returns with regards to vehicle operation. However, the techniques described herein are more general and apply to simulating depth sensor return(s) in general. FIG. 4 illustrates a process in accordance with more general examples of the present disclosure. The process is illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 4 depicts an example process 400 for simulating a return of a depth sensor. Some or all of the process 400 may be performed by one or more components in FIG. 3, as described herein. For example, some or all of the process 400 may be performed by the vehicle computing device(s) 304.

At operation 402, the process 400 comprises obtaining a plurality of samples associated with a simulated environment in a vicinity of a depth sensor. Each sample of the plurality of samples may have associated depth data, indicative of a distance between a respective object in the simulated environment and a simulated location of the depth sensor, and reflectivity data indicative of a reflectivity of the respective object.

The depth sensor may be any sensor configured to determine information relating to a distance between one or more objects in a vicinity of the depth sensor and the depth sensor. Examples include, but are not limited to, a lidar sensor, a radar sensor and sonar sensor.

The simulated environment may be any environment in which the operation of a depth sensor may be simulated. For instance, the simulated environment may be a 3D environment associated with an autonomous vehicle, such as has been described with reference to FIG. 1 and FIG. 2. In other examples, the simulated environment may be associated with topographic mapping, urban planning, land surveying, environmental monitoring, construction, architecture, an archaeological site, meteorological research, a search and rescue operation amongst other examples.

The plurality of samples may correspond to respective objects that are in the vicinity of the depth sensor. The plurality of samples may be obtained by selecting an object along a particular line of sight of the depth sensor. Properties associated with the sample may then be readily obtained, such as a distance to a point on the surface of the object along that line of sight, and a reflectivity of the surface at the point on the surface of the object along that line of sight. This may be achieved via any 3-dimensional simulation technique. In an example, a ray casting technique is used whereby a plurality of rays are cast onto the simulated environment, and samples are obtained where those rays intersect with objects in the simulated environment.

In another example, the plurality of samples may correspond to respective objects that are associated with a discretized two-dimensional representation of the simulated environment. The two-dimensional representation may be a projection of the simulated environment onto a frame of reference (e.g. point of view) of the depth sensor. Any two-dimensional projection of the simulated environment may be used. The two-dimensional representation may be discretized based on known properties of a corresponding real-world depth sensor. For instance, the discretization may aim to mimic the sensor resolution of the corresponding real-world sensor.

The plurality of samples may then be obtained from the simulated environment via one or more graphics rendering procedures. Rasterization and ray tracing procedures have been described above with regards to FIG. 2, but any 3D to 2D rendering technique may be contemplated. The graphics rendering procedure may determine the depth and reflectivity data and assign a sample to a respective position on the two-dimensional representation. The respective position may correspond to a line of sight from the depth sensor towards an object in the simulated environment associated with the sample. An example procedure for obtaining a plurality of samples is described below in relation to FIGS. 5 and 6.

At operation 404, the process 400 comprises determining that a first one of the plurality of samples is within a region associated with a projection from the depth sensor. The bounded region may be a 3D volume, such as a cone with vertex centered on a location of the depth sensor. Where a 3D ray casting technique is used to cast rays from the depth sensor onto the simulated environment, samples obtained from within such a cone may be selected as a subset of samples. This corresponds to selecting all objects that would be illuminated by a beam of a real-world depth sensor undergoing beam spread.

The bounded region may be a bounded two-dimensional area associated with a projection from the depth sensor. The two-dimensional area may correspond to an area of an emitted beam at a particular distance from the depth sensor. As described above, the projection may correspond to a discretized two-dimensional representation of the simulated environment, from the frame of reference of the depth sensor. The plurality of samples obtained at operation 402 may be distributed across the representation according to the discretization. The bounded two-dimensional area referred to as part of operation 404 may correspond to the three-dimensional sub-region occupied by a simulated depth sensor beam as it travels away from the depth sensor, as has been discussed above with regards to FIG. 2. A subset of samples that fall within the bounded area may be obtained. An example of obtaining such a subset is described in further detail with regards to FIG. 7.

From the subset, the first one of the plurality of samples may be determined. The determination may be made via a weighting scheme. For example, each sample obtained in operation 402 may be assigned a respective weight. A weight may be an indication of a depth, reflectivity and/or other material property of the associated object. A function of the weight may be to emulate an effect that a sample would have on a real depth sensor detection. For instance, a higher weight may be assigned to a sample that would be expected to have a larger echo (e.g. higher amplitude). For this reason, an object (e.g. candidate sample) may be assigned a higher weight if it is closer to the depth sensor relative to other objects in the simulated environment. The object may also, or alternatively, be assigned a higher weight if its reflectivity is higher relative to other objects in the simulated environment. Of course, any weighting scheme is envisaged. For example, a lower weighting may be assigned to objects that are more likely to result in a higher echo.

As has been described above, the weight, W, may be determined by the function, F, of the depth, D, and reflectivity, R, such as is illustrated in Equation 1 above. In another example, a weight might be an output of, or derived from an output of, a machine learned model. Such a machine learned model may be trained to output a higher weight for higher depth and reflectivity data provided as input to the model.

In an example, where an object is expected to have a highest echo for a single depth sensor detection, a sample associated with a simulation of the object should be assigned a higher weight and parameters associated with the weighting may be adjusted so that this weighting is realized. Similarly, the weighting(s) may be set, or trained, so that a lowest weighting (in a subset) is assigned to an object that is furthest from the depth sensor. The setting, or training, of the weightings may also take into account the effect of distractors that may be relatively close to the depth sensor, but may have a relatively low reflectivity (since they may occupy only a small portion of the depth sensor beam). In any case, weights can be set, or trained, so that the weighted samples behave like their real-world counterparts. The aim might be to generate a list of samples that, when organized by their respective weights, match peaks in a corresponding real-world depth sensor measurement ordered by their relative amplitudes.

At operation 406, the process 400 comprises determining that a second one of the plurality of samples is within the bounded region associated with the projection from the depth sensor and may be different from the first one of the plurality of samples. Operation 406 may be performed in a similar manner as for operation 404. Again, the second one of the plurality of samples may be determined based on a weight assigned to it. For instance, the second one of the plurality of samples may be determined based on it having a lowest assigned weight amongst other samples that are within the bounded tow-dimensional area.

At operation 408, the process 400 comprises simulating, based at least in part on the first one of the plurality of samples and the second one of the plurality of samples, a return of the depth sensor. The simulated return may depend on the properties of the depth sensor being simulated. For instance, and as discussed above, the simulated return may be a strongest, weakest, earliest, latest return when the depth sensor being simulated is operating in a “single return” mode. Examples of identifying particular returns based on respective weights has been described above for operation 404. When simulating a depth sensor operating in a “single return” mode, the process 400 therefore more accurately emulates the operation of a real-world depth sensor by selecting one from a plurality of samples upon which to base the simulated return.

Operation 408 may also be used to simulate more than one return, for example where the depth sensor being simulated is operating in a “dual”, or higher, return mode. In a “dual return” simulation, operation 408 may simulate a strongest and a latest return based on the first and second of the plurality of samples. By simulating two (or more) returns, techniques that can be applied to real depth sensor returns can be applied to the simulated returns to distinguish between non-distractor and distractor objects in a simulated environment.

Figure 5:
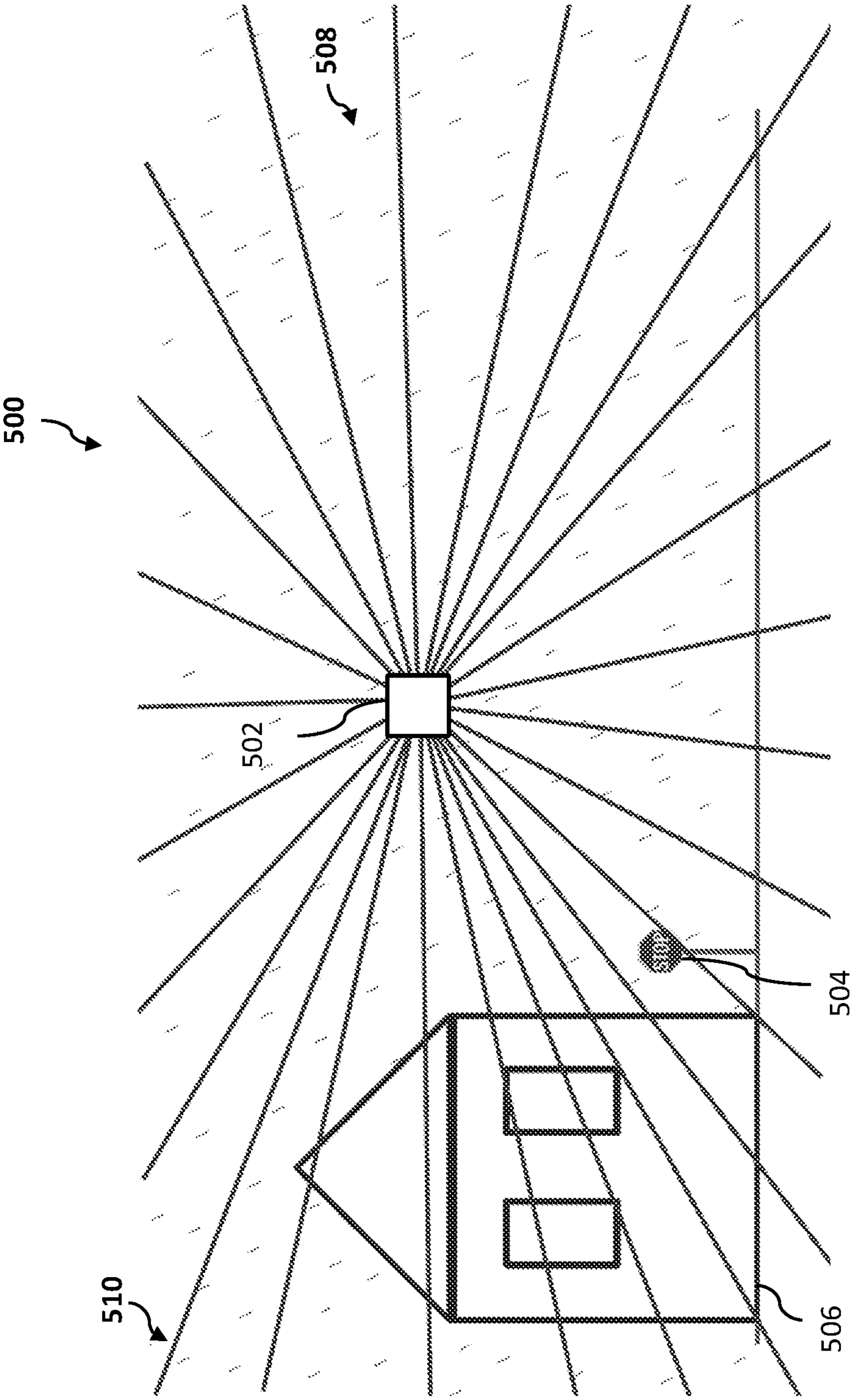
FIG. 5 depicts an example of obtaining a plurality of depth sensor samples.

An example procedure for obtaining a plurality of samples, perhaps with regards to operation 402 of the process 400, is illustrated in FIG. 5. FIG. 5 shows an example simulated scenario 500 in which a plurality of samples are obtained from a frame of reference of a simulated depth sensor 502. The simulated scenario may be similar to that shown in FIG. 1 in that in the vicinity of the depth sensor 502 is a road signal 504, a building 506 and distractors, in the form of rain 508. The procedure illustrated in FIG. 5 may be performed using a rendering procedure as described above, such as a rasterization process or a ray tracing algorithm.

A plurality of rays 510 are illustrated, with each ray corresponding to a sample to be obtained. The plurality of rays 510 may be an oversampling of the simulated environment in that there are more simulated rays 510 than depth sensor beams that would be emitted in a given time period. Where each ray intercepts an object (e.g. road sign 504, building 506 and raindrop), a sample can be obtained. Obtaining the sample may involve storing the depth data associated with the object, as well as possibly a reflectivity of the object.

As described above, a level of translucency, or transparency, of an object in the simulated environment can be used to determine whether to select an object as a sample. For instance, a semi-transparent object may be selected as a sample if it is determined that it has a transparency over a threshold transparency. In other examples, each object may be assigned an indicator of translucency, which may be a probability or some other weighting. A sampling technique may be used to select an object as a sample based on the indicator.

For instance, when a first object is not selected based on its level of transparency, a second object, directly behind the first object (from the frame of reference of the depth sensor) may be selected as the sample instead. A similar sampling technique may be applied to the second object and so the second object may, or may, not be selected based on an associated transparency.

When a first object is not selected based on its level of transparency, a second object, directly behind the first object (from the frame of reference of the depth sensor) may be selected as the sample instead. A similar sampling technique may be applied to the second object and so the second object may, or may, not be selected based on an associated transparency.

Figure 6:
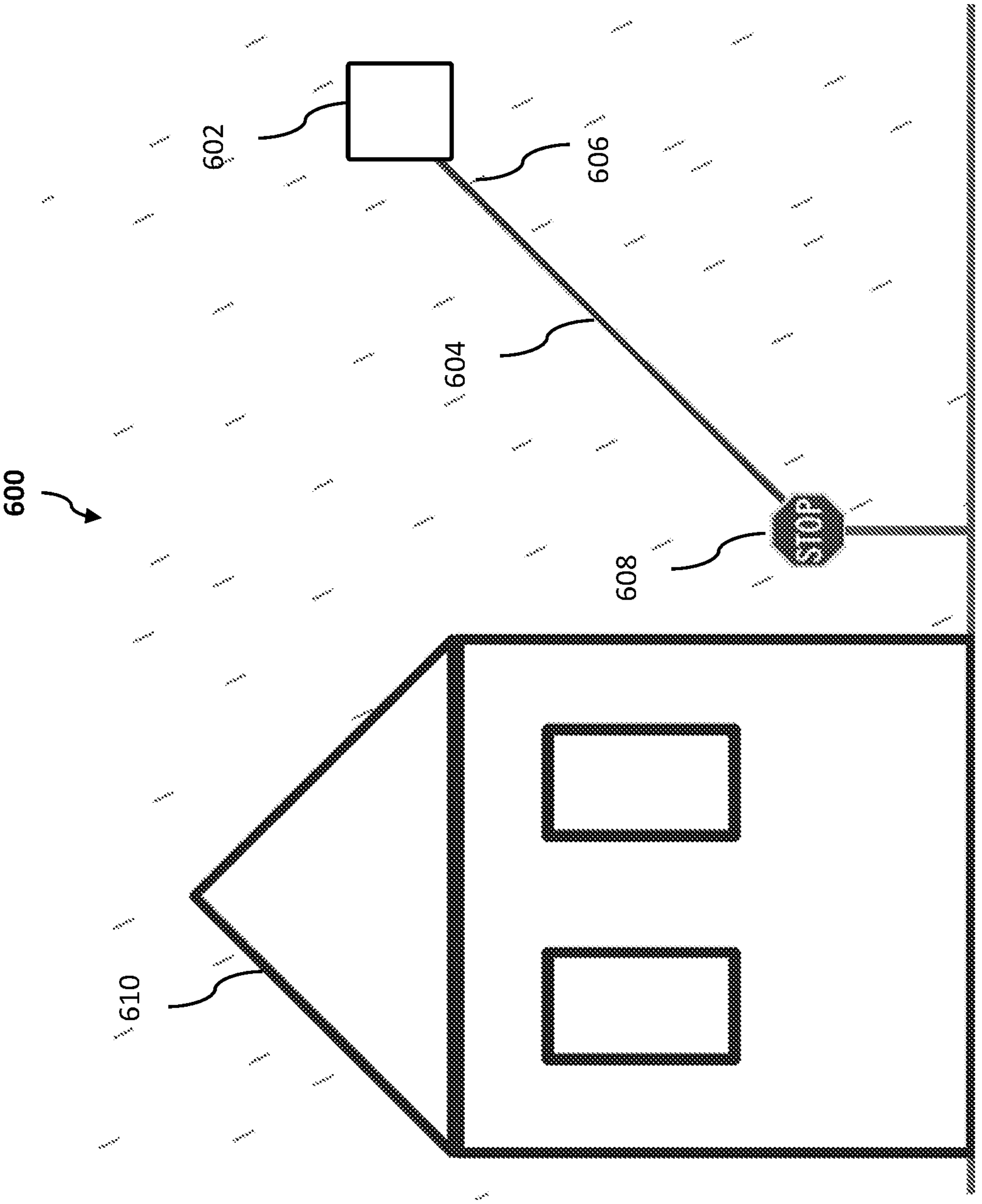
FIG. 6 depicts an example of selecting a sample based on transparency.

An example procedure for selecting, or determining, a sample based on transparency is illustrated in FIG. 6 which shows an example simulated scenario 600. The simulated scenario 600 may be the same simulated scenario 500 illustrated in FIG. 5.

In the example simulated scenario 600, a ray 604 extending from a simulated depth sensor 602 intersects a rain drop 606. The raindrop 606 may be nearly transparent in that some of the depth sensor's beam may be reflected off a surface of the raindrop 606 and some of the depth sensor's beam may be transmitted through the raindrop 606. The portion of the ray 604 that is transited through the raindrop 606 then intersects the road sign 608. The road sign 608 may be a completely opaque object and so there would be no further transmission of the ray 604 beyond the road sign 608.

There is therefore a decision to make as to which of the raindrop 606 or the road sign 608 are selected as a sample to be obtained. At least one technique described herein involves selecting one of the raindrop 606 or the road sign 608 based on respective assigned indicators of transparency. In an example, the indicator may be a probability (i.e. a number between 0 and 1), and the raindrop 606 may be assigned a probability of 0.5, meaning that it is equally likely that the raindrop 0.5 will, and will, not be associated with a depth sensor echo along a line associated with the ray 604. The assigned probabilities can be determined, or learned, based on ground truth data. For instance, a point cloud of simulated depth sensor data may be compared with a real depth sensor point cloud, for the same scenario, and the assigned probabilities can be adjusted so that the point clouds approximately match. This process can be repeated for a number of weather conditions and environments. Machine learning algorithms may be used in the learning process.

Any suitable sampling technique can then be used to determine whether to select the raindrop 606 as the sample based on its assigned probability of 0.5. For instance, a random number between 0 and 1 may be generated, and if the random number is below the probability assigned to the object, then the object may be selected as the sample.

If the raindrop 606 is not selected as the sample, the process proceeds along the ray 604 until it intersects the next object along its path, which in the example simulated scenario 600 is the road sign 608. As mentioned above, the road sign 608 may be completely opaque and so assigned a probability of 1. This means that the road sign 608 will always be selected as the sample when the ray 604 intersects it.

The example simulated scenario 600 also includes a building 610, although this is not within the path of the ray 604 and so cannot be selected as a sample along a line of sight associated with the ray 604.

Figure 7:
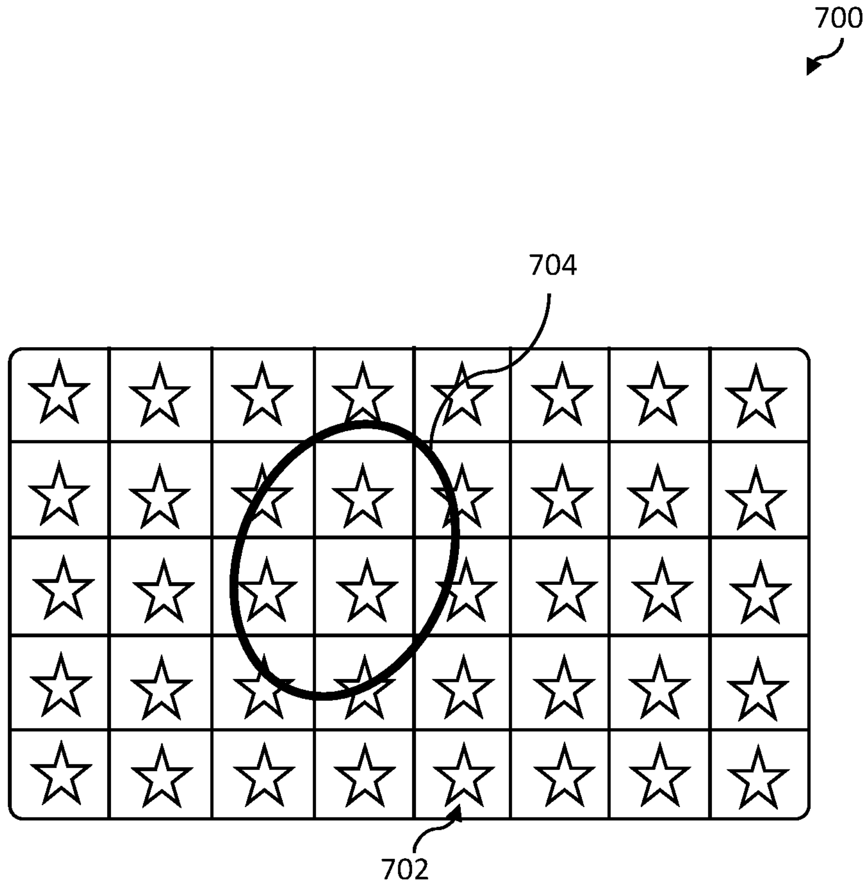
FIG. 7 illustrates an example of selecting an area of a two-dimensional representation of a simulated environment corresponding to a region swept out by a depth sensor beam.

FIG. 7 illustrates an example process for obtaining a subset of samples from which one or more depth sensor returns can be simulated. FIG. 7 shows a grid 700 forming a discretization of a two-dimensional representation of a simulated environment from the frame of reference of a depth sensor.

Each square formed by the grid 700 stores a respective sample (represented by stars) that may be obtained using operation 402. The samples may be distributed based on the spatial positions of the objects associated with the samples from the frame of reference of the depth sensor.

The bounded two-dimensional area referred to as part of operation 404 may correspond to the three-dimensional sub-region occupied by a simulated depth sensor beam as it travels away from the depth sensor, as has been discussed above with regards to FIG. 2. A subset of samples that fall within the bounded area may be obtained. In FIG. 7, this corresponds to selecting all samples 702 that fall within a region 704 of the grid 700, with the shape of the region 704 corresponding to the maximum expected spread experienced by the depth beam in operating conditions. The shape of the region 704 appears as a skewed circle due to how the two-dimensional projection of the simulated environment is performed (e.g. via an environment mapping). The subset of samples that fall within the region 704 may be identified as corresponding to objects whose echoes would be expected to be received when a real depth sensor emits a single beam.

From this subset, operations 404 and 406 may be performed to select, or identify, first and second samples, perhaps based on assigned weights. Operation 408 may then be performed to simulate one or more depth sensor returns based on the selected first and second samples.

EXAMPLE CLAUSES

The description contains the following numbered clauses:

1. A: A system comprising:
   - one or more processors; and
   - one or more non-transitory computer-readable media storing computer-executable instructions that, when executed, cause the system to perform operations comprising:
   - obtaining a plurality of samples associated with a two-dimensional projection of a simulated three-dimensional environment in a vicinity of an autonomous vehicle corresponding to a frame of reference of a lidar sensor, wherein at least one of the plurality of samples comprises:

depth data indicative of a distance between an object in the simulated three-dimensional environment and a simulated location of the lidar sensor associated with the autonomous vehicle; and reflectivity data indicative of a reflectivity of the object;

identifying a subset of the plurality of samples that fall within an area of the two-dimensional projection corresponding to a three-dimensional subregion of the simulated three-dimensional environment defined by a beam of the lidar sensor;

identifying a first sample in the subset based on a first weight assigned to the first sample and a second sample, different from the first sample, in the subset based on a second weight assigned to the second sample, wherein the first weight and the second weight are based at least in part on respective depth and reflectivity data; and simulating a return of the lidar sensor in simulation based at least in part on the first and second weights.

B. The system according to clause A, wherein the operations further comprise:

determining the plurality of samples and the two-dimensional projection using a rasterization procedure that comprises applying a dithering algorithm that selects or rejects candidate samples based on transparency of an associated object in the simulated three-dimensional environment.

C. The system according to clause A or B, wherein the operations further comprise:

determining the first and second weights such that objects in the simulated three-dimensional environment that are closer to the simulated location of the lidar sensor, and have higher reflectivity, are assigned higher weights, and wherein the first weight is the highest weight amongst the weights assigned to samples within the subset of the plurality of samples and represents a strongest return, and the second weight is the lowest weight amongst the weights assigned to the samples within the subset of the plurality of samples and represents a weakest return.

D. The system according to any of clauses A-C, wherein the return of the lidar system is a first return, and wherein the operations further comprise:

simulating a second return of the lidar sensor in simulation based on the first and second samples.

E. A method comprising:

obtaining a plurality of samples associated with a simulated environment in a vicinity of a depth sensor, wherein:

a first one of the plurality of samples is within a bounded region associated with a projection from the depth sensor;

a second one of the plurality of samples is within the bounded region associated with the projection from the depth sensor and is different from the first one of the plurality of samples; and simulating, based at least in part on the first one of the plurality of samples and the second one of the plurality of samples, a return of the depth sensor.

F. The method of clause E, wherein the return of the depth sensor is a first return, the method comprising:

simulating, based at least in part on the first one of the plurality of samples and the second one of the plurality of samples, a second return of the depth sensor.

G. The method of clause E or F, comprising:

generating instructions to control a simulated vehicle based on the return of the depth sensor.

H. The method of any of clauses E-G, comprising:

assigning weights to the plurality of samples based on:

depth data indicative of a distance between a respective object in the simulated environment and a simulated location of the depth sensor; and reflectivity data indicative of a reflectivity of the respective object; and determining the first one of the plurality of samples and the second one of the plurality of samples from the subset of the plurality of samples based on the weights.

I. The method of clause H, wherein the weights are assigned such that objects in the simulated environment that are closer to the simulated location of the depth sensor, and have higher reflectivity, are assigned one of higher or lower weights, and wherein the first one of the plurality of samples and the second one of the plurality of samples are determined by comparing weights assigned to samples in the subset of the plurality of samples.

J. The method of any of clauses E-I, comprising:

determining that the first one and the second one of the plurality of samples are within a bounded two-dimensional area associated with a two-dimensional projection from the depth sensor, wherein the area corresponds to a subregion of the simulated environment defined by a beam of the depth sensor.

K. The method of clause J, comprising:

determining that the first one and the second one of the plurality of samples are within the bounded two-dimensional area associated with the two-dimensional projection from the depth sensor using a rasterization procedure that comprises applying a dithering algorithm that selects or rejects candidate samples based on transparency of an associated object in the simulated environment.

L. The method of clause J, comprising:

determining that first one and the second one of the plurality of samples are within the bounded two-dimensional area associated with the two-dimensional projection from the depth sensor using a ray tracing algorithm.

M. The method of any of clauses E-L, wherein the simulated environment comprises at least one of: precipitation, fog, smoke, smog, dust, steam and debris within a vicinity of the depth sensor.

N. One or more non-transitory computer-readable media storing instructions executable by one or more processors, wherein the instructions, when executed, cause the one or more processors to perform operations comprising:

obtaining a plurality of samples associated with a simulated environment in a vicinity of a depth sensor, wherein:

a first one of the plurality of samples is within a bounded region associated with a projection from the depth sensor;

a second one of the plurality of samples is within the bounded region associated with the projection from the depth sensor and is different from the first one of the plurality of samples; and simulating, based at least in part on the first one of the plurality of samples and the second one of the plurality of samples, a return of the depth sensor.

O. The one or more non-transitory computer-readable media of clause N, wherein the return of the depth sensor is a first return, and wherein the instructions, when executed, cause the one or more processors to perform further operations comprising:

simulating, based at least in part on the first one of the plurality of samples and the second one of the plurality of samples, a second return of the depth sensor.

P. The one or more non-transitory computer-readable media of clause N or O, wherein the instructions, when executed, cause the one or more processors to perform further operations comprising:

generating instructions to control a simulated vehicle based on the return of the depth sensor.

Q. The one or more non-transitory computer-readable media of any of clauses N-P, wherein the instructions, when executed, cause the one or more processors to perform further operations comprising:

assigning weights to the plurality of samples based on:

depth data indicative of a distance between a respective object in the simulated environment and a simulated location of the depth sensor; and reflectivity data indicative of a reflectivity of the respective object; and determining the first one of the plurality of samples and the second one of the plurality of samples from the subset of the plurality of samples based on the weights.

R. The one or more non-transitory computer-readable media of any of clauses N-Q, wherein the instructions, when executed, cause the one or more processors to perform further operations comprising:

determining that the first one and the second one of the plurality of samples are within a bounded two-dimensional area associated with a two-dimensional projection from the depth sensor, wherein the area corresponds to a subregion of the simulated environment defined by the a of the depth sensor.

S. The one or more non-transitory computer-readable media of clause R, wherein the instructions, when executed, cause the one or more processors to perform further operations comprising:

determining that the first one and the second one of the plurality of samples are within the bounded two-dimensional area associated with the two-dimensional projection from the depth sensor using a rasterization procedure that comprises applying a dithering algorithm that selects or rejects candidate samples based on transparency of an associated object in the simulated environment.

T. The one or more non-transitory computer-readable media of clause R, wherein the instructions, when executed, cause the one or more processors to perform further operations comprising:

determining that first one and the second one of the plurality of samples are within the bounded two-dimensional area associated with the two-dimensional projection from the depth sensor a using a ray tracing algorithm.

U. The one or more non-transitory computer-readable media of clauses N-T, wherein the simulated environment comprises at least one of: precipitation, fog, smoke, smog, dust, steam and debris within a vicinity of the depth sensor.

V. A system comprising:

one or more processors; and one or more non-transitory computer-readable media storing computer-executable instructions that, when executed, cause the system to perform the operation of clauses E-M.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

obtaining a plurality of samples associated with a two-dimensional projection of a simulated three-dimensional environment in a vicinity of an autonomous vehicle corresponding to a frame of reference of a lidar sensor, wherein at least one of the plurality of samples comprises:

depth data indicative of a distance between an object in the simulated three-dimensional environment and a simulated location of the lidar sensor associated with the autonomous vehicle; and reflectivity data indicative of a reflectivity of the object;

identifying a subset of the plurality of samples that fall within an area of the two-dimensional projection corresponding to a three-dimensional subregion of the simulated three-dimensional environment defined by a beam of the lidar sensor;

identifying a first sample in the subset based on a first weight assigned to the first sample and a second sample, different from the first sample, in the subset based on a second weight assigned to the second sample, wherein the first weight and the second weight are based at least in part on respective depth and reflectivity data; and simulating a return of the lidar sensor in simulation based at least in part on the first and second weights.

2. The system according to claim 1, wherein the operations further comprise:

determining the plurality of samples and the two-dimensional projection using a rasterization procedure that comprises applying a dithering algorithm that selects or rejects candidate samples based on transparency of an associated object in the simulated three-dimensional environment.

3. The system according to claim 1, wherein the operations further comprise: determining the first and second weights such that objects in the simulated three-dimensional environment that are closer to the simulated location of the lidar sensor, and have higher reflectivity, are assigned higher weights, and wherein the first weight is the highest weight amongst the weights assigned to samples within the subset of the plurality of samples and represents a strongest return, and the second weight is the lowest weight amongst the weights assigned to the samples within the subset of the plurality of samples and represents a weakest return.

4. The system according to claim 1, wherein the return of the lidar sensor is a first return, and wherein the operations further comprise:

simulating a second return of the lidar sensor in simulation based on the first and second samples.

* * * * *